No. 821,274. PATENTED MAY 22, 1906.
A. T. AMES.
CLAMP GUIDE FOR PUMP RODS.
APPLICATION FILED AUG. 15, 1905.
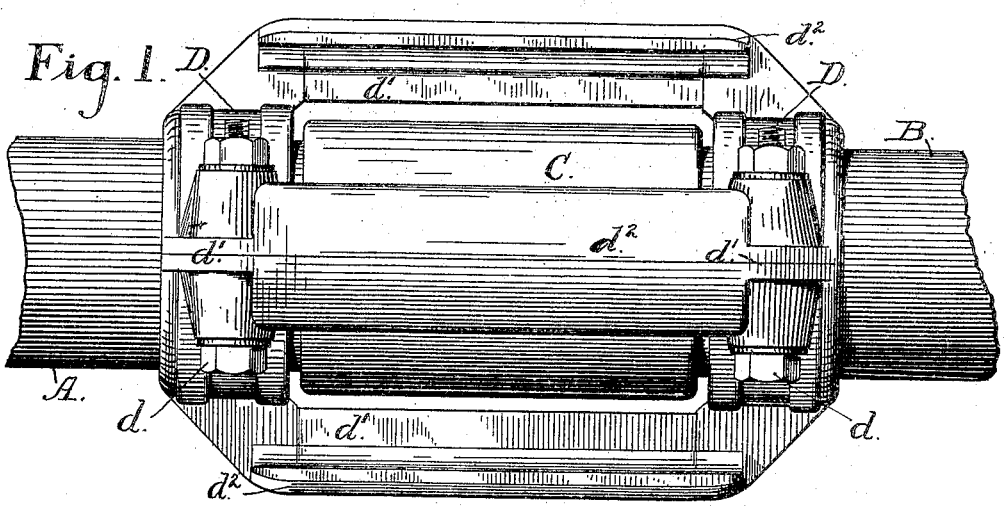
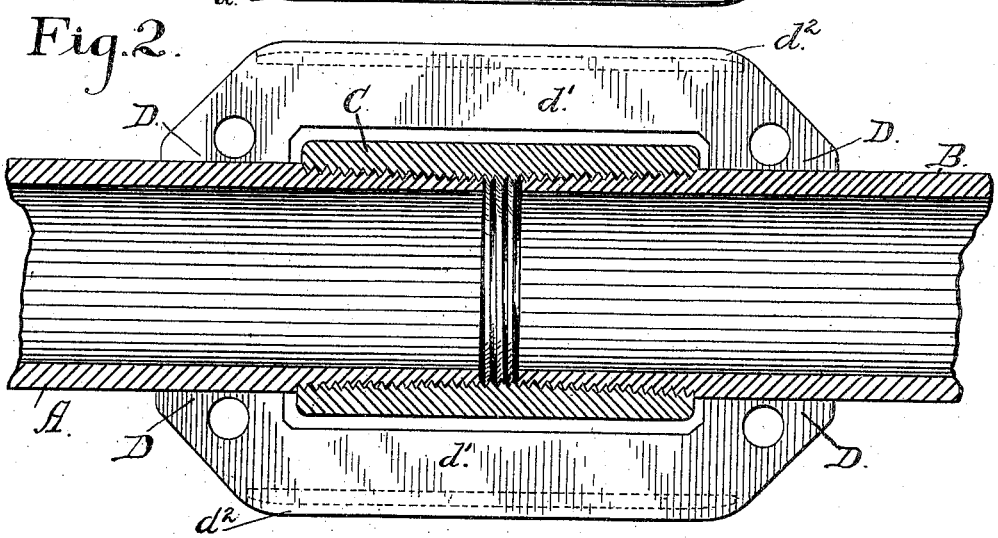
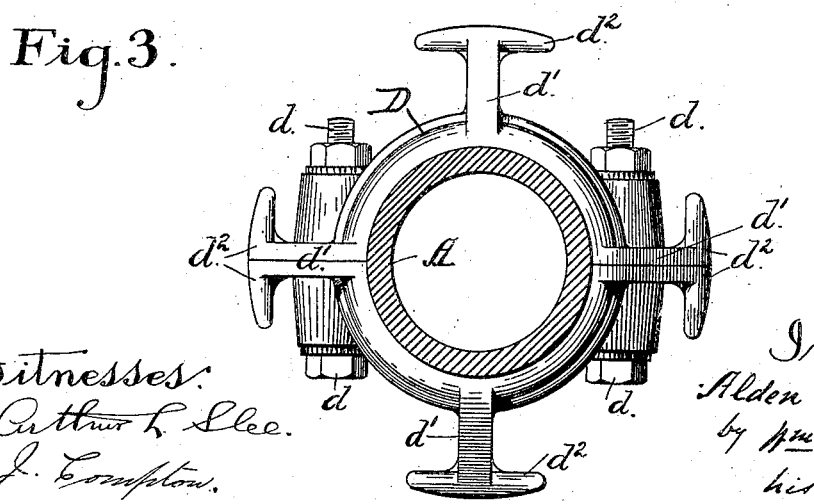
Witnesses:
Arthur L. Lee.
J. Compton.
Inventor.
Alden T. Ames
by Wm. F. Booth
his Attorney.

UNITED STATES PATENT OFFICE.

ALDEN THAYER AMES, OF GALT, CALIFORNIA.

CLAMP-GUIDE FOR PUMP-RODS.

No. 821,274.   Specification of Letters Patent.   Patented May 22, 1906.

Application filed August 15, 1905. Serial No. 274,269.

*To all whom it may concern:*

Be it known that I, ALDEN THAYER AMES, a citizen of the United States, residing at Galt, Sacramento county, State of California, have invented certain new and useful Improvements in Clamp-Guides for Pump-Rods; and I do hereby declare the following to be a full, clear, and exact description of the same.

My invention relates to the general class of coupling connections for sections of pipes or tubes when united to form a continuous rod, and is especially applicable to pump-rods. In rods of this character stability and rigidity of joints and the avoidance of undue vibration are essential to efficiency. To secure these essentials are the objects of my invention, which consists in the novel clamp-guide which I shall hereinafter fully describe by reference to the accompanying drawings, in which—

Figure 1 is a side elevation of my clamp-guide applied to a pump-rod. Fig. 2 is an inner face view of one-half the clamp-guide applied to the rod, which, with its usual coupling, is shown in section. Fig. 3 is an end view of the clamp-guide on the rod which is shown in cross-section.

The pipe or tube sections A and B, which form part of the rod, are united, as is usual, by a coupling or sleeve C, into which they are screwed. When this coupling is the only connection for the rod-sections, the latter tend to unscrew, and even when tight the joint is not sufficiently rigid for the work imposed upon the rod when used for a pump. In order to give greater rigidity to the joint, as well as to render it more stable by preventing the sections from unscrewing from the coupling C, I fit around the rod-sections just beyond the ends of the coupling the clamp-bands D. These are made in halves secured and tightened together by bolts $d$. Suitable webs $d'$ extend between and connect the two bands, so that the clamp as a whole comprises symmetrical halves each consisting of a semicircular band at each end with connecting-webs. It will be seen that when this clamp is fitted to the rod over its coupling C the joint is stiffened and the sections are prevented from unscrewing. Now in order to make the clamp serve also as a guide to prevent undue vibration of the rod within its outer casing I form the webs $d'$ or otherwise provide them with shoes $d^2$, which by contact with the casing secure the result desired. There may be as many of these shoes as desired, in the instance illustrated two oppositely-disposed pairs, and the bands and webs and guides may be all cast integral, as shown.

Having thus described my invention, what I claim as new, and desire to secure by Letters Patent, is—

1. A clamp for pump-rods having a joint, comprising a pair of bands with means for securing them upon the rod, at opposite sides of the joint, and a web extending over the joint connecting the said bands.

2. A clamp for pump-rods comprising a pair of bands, a rigid connection therebetween and each band consisting of opposing halves adapted to embrace the rod between them, and bolts for securing and tightening said halves upon the rod.

3. A clamp-guide for pump-rods comprising a pair of bands with means for securing them upon the rod, webs uniting the bands and shoes on the webs.

4. A clamp-guide for pump-rods comprising a pair of bands, each composed of opposing halves with bolts for tightening them upon the rod, webs uniting said bands and shoes on the webs.

5. In combination with adjacent sections of a pump-rod and a coupling-sleeve into which their meeting ends are screwed, a pair of bands clamped upon said sections beyond the ends of said sleeve, and a web extending over said sleeve connecting said bands.

6. In combination with adjacent sections of a pump-rod and a coupling-sleeve into which their meeting ends are screwed, a pair of bands, each consisting of opposing halves fitted to the sections beyond the ends of said sleeve, separated webs for connecting the bands and bolts for clamping said halves upon the sections.

7. In combination with adjacent sections of a pump-rod and a coupling-sleeve into which their meeting ends are screwed, a pair of bands clamped upon said sections beyond the ends of said sleeve, webs uniting said bands and guide-shoes on said webs.

8. In combination with adjacent sections of a pump-rod and a coupling-sleeve into which their meeting ends are screwed, a pair of bands each consisting of opposing halves fitted to the sections beyond the ends of said sleeve, bolts for clamping said halves upon the sections, and webs uniting said bands and elongated guide-shoes on said webs.

In witness whereof I have hereunto set my hand.

ALDEN THAYER AMES.

Witnesses:
E. B. KIENTZ,
W. B. SAWYER.